United States Patent [19]

Miller

[11] 4,156,866
[45] May 29, 1979

[54] MULTIPLE REMOTE TERMINAL DIGITAL CONTROL SYSTEM

[75] Inventor: Charles M. Miller, Detroit, Mich.

[73] Assignee: Systems Technology Corporation, Detroit, Mich.

[21] Appl. No.: 876,117

[22] Filed: Feb. 28, 1978

Related U.S. Application Data

[63] Continuation of Ser. No. 730,180, Oct. 7, 1976, abandoned.

[51] Int. Cl.² .............................................. G06F 11/08
[52] U.S. Cl. .................. 340/146.1 C; 340/146.1 BA; 340/163; 364/119
[58] Field of Search ............... 364/200, 900, 740, 119; 340/310 A, 163, 147 MT, 147 LP, 146.1 BA, 146.1 C

[56] References Cited

U.S. PATENT DOCUMENTS

| | | | |
|---|---|---|---|
| 3,470,542 | 9/1969 | Trantanella | 364/200 X |
| 3,539,998 | 11/1970 | Belcher et al. | 364/200 |
| 3,771,135 | 11/1973 | Huettner et al. | 364/200 |
| 3,796,994 | 3/1974 | Nuss, Jr. | 340/163 |
| 3,828,313 | 8/1974 | Schull et al. | 340/147 SY |
| 3,833,930 | 9/1974 | Macker | 364/200 |
| 3,876,980 | 4/1975 | Haemmig et al. | 340/146.1 BA |
| 3,898,373 | 8/1975 | Walsh | 364/200 X |
| 3,909,790 | 9/1975 | Shapiro et al. | 364/200 |
| 3,919,690 | 11/1975 | Field et al. | 340/146.1 BA |
| 3,990,046 | 11/1976 | Katz et al. | 340/163 X |
| 4,007,458 | 2/1977 | Hollabaugh | 340/310 A X |
| 4,060,735 | 11/1977 | Pascucci et al. | 340/310 A X |

Primary Examiner—Gareth D. Shaw
Assistant Examiner—Thomas M. Heckler
Attorney, Agent, or Firm—Krass & Young

[57] ABSTRACT

A central processor exercises on-off power control over a number of widely spaced loads and determines the status of the loads through a system which includes a transmitter-receiver terminal at each load and a common data bus connecting the central station to all of the transmitter-receivers. Each receiver has a unique address and the processor addresses one of the receivers by sending a message consisting of the receiver's address plus a command signal over the bus. A valid message consists of two sequential transmissions of the unit's address and the combination of command signals that accompany these addresses determines the function that is enabled at the receiver. All transmissions are serial and repeaters interposed in the bus restore signal levels and provide power to nearby terminals.

6 Claims, 3 Drawing Figures

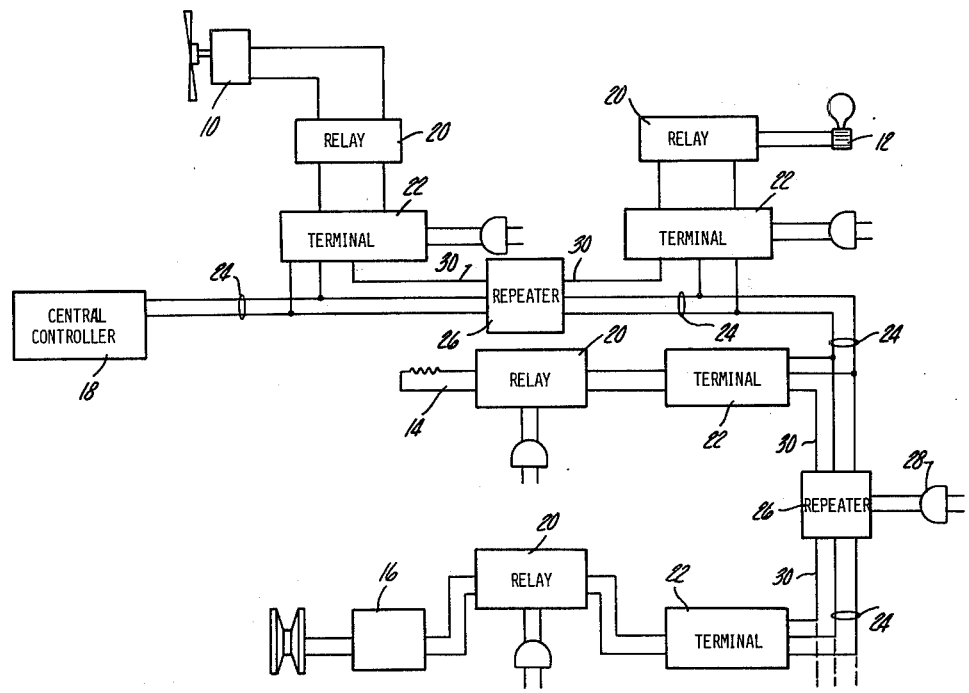

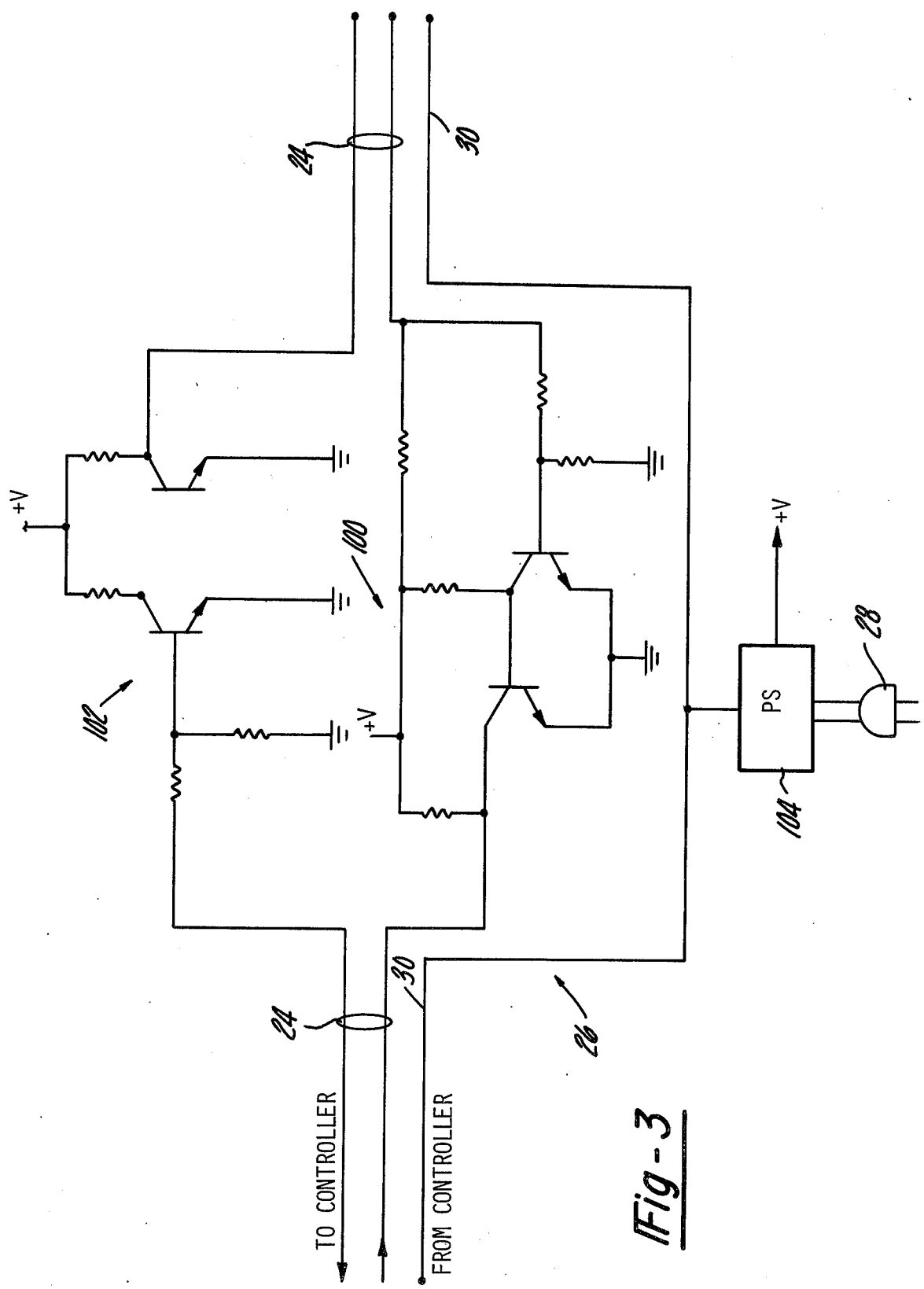

MULTIPLE REMOTE TERMINAL DIGITAL CONTROL SYSTEM

This is a continuation, of application Ser. No. 730,180, filed Oct. 7, 1976, now abandoned.

BACKGROUND OF THE INVENTION

1. Field of the Invention

This invention relates to wired systems for controlling a plurality of remotely located loads from a central station employing digital messages sent over a common interconnecting bus.

2. Prior Art

In commercial and industrial facilities it is often desirable to control the application of power to a number of loads spaced about the facility from a central control point. The central control may be exercised manually, as by an operator who switches the loads on and off on the basis of measured operating criteria or a time schedule; or automatically by clock controlled circuitry or a central computer. In one form of system a computer monitors the electric power usage of the entire facility and automatically switches on and off various loads in accordance with an algorithm which regulates power consumption to minimize the charges for the electric power.

In these systems each of the remote loads has been directly wired to the central controller or relays connected to each load have been directly wired to the central controller.

In systems which exercise control over a large number of loads spaced about a facility, the wiring cost for such a system is very high and difficulties are encountered in maintaining the system because of the large number of wired runs.

A similar problem is encountered in remote terminal computer systems. Wiring runs to connect a central processing unit (CPU) with a large number of terminals located remotely about a facility can be very large and the problem is intensified when the wired connections must be of a type which will allow high rates of data transmission between the CPU and the terminals. In this environment the wiring problem has been solved by use of common bus structures employing a single cable connecting the CPU to all of the terminals, rather than separate wire runs from each of the terminals to the CPU. A signal transmitted on the bus by the CPU or by one of the terminals is received by all of the other elements connected to the system. Each terminal has a unique address and the destination of a message is determined by an address transmitted on the bus along with the message. Because of the high data transfer rates required in these computer systems, the common bus communication systems have employed very sophisticated and complex techniques including modulated carriers which necessitate the use of modems at each of the stations, and complex addressing and decoding schemes and the like. While these systems have enough versatility to allow their application to the relatively simplistic remote load control problem no economy would be achieved substituting such a sophisticated system for a wiring system wherein each load is connected to the controller by a separate line.

SUMMARY OF THE INVENTION

The present invention is broadly directed toward a common bus system for allowing a central controller to switch a plurality of remotely located loads, and to determine the status of these loads which utilizes certain of the techniques employed in the common bus remote terminal computer systems in a unique configuration which achieves substantial economies over the alternative of directly wiring the controller to each of the loads. The system of the present invention is very low in speed and limited in message capability when compared to these computer common bus systems and these features, which are unnecessary in a load control system, are traded off in favor of low cost and high reliability.

A preferred embodiment of the present invention, which will subsequently be disclosed in detail, employs serial, direct current transmissions. To allow the use of relatively low cost, high resistance conductors without deteriorating the DC signal levels unacceptably, signal repeaters are inserted along long runs of the common bus. The bus includes two data lines, one of which carries messages from the controller to the remote terminals and the other of which carries return messages. The repeaters restore the DC signal levels sent along both data lines.

The serial messages placed on the bus by the controller consist of the address of the terminal to be controlled and a digital command.

In the preferred embodiment of the invention a digital command consists of a single binary bit. When the address section of a message received by a terminal compares positively with its stored addresss, one of two devices are set depending upon whether the command bit is a 1 or a 0. When the next message sent over the bus from the controller is received, the set register is cleared if the new message contains a different address. If the next message contains the same address, one of three functions are enabled at that terminal, depending upon the command bits forming part of the two messages. If the two command bits are both ones a first function is enabled; if the two command bits are both zeros a second function is enabled; and if the two function bits are different a third function is enabled. In alternative embodiments of the invention different sequences of different command bits could produce different functions, or more than one command bit could be provided and multiple functions implemented. In the preferred embodiment of the invention the three functions are "on", "off" and "transmit status". The status is simply an indication of whether the device is on or off.

This redundant addressing scheme substantially enhances the reliability of the present system. It also enables the use of one of the address bits, which also serves as a parity bit, as part of the address itself. Thus, in a preferred embodiment of the invention, 256 separate terminals may be addressed employing an eight-bit address in which one of the bits also serves as a parity check bit. Thus, two different devices may have the same seven bits of address and differ only in the eighth bit which also checks the parity. This creates the possibility of a single bit address error activating the wrong terminal. By use of the redundant check the incorrect address signal would be nulled unless it were sent twice sequentially. The fact that this message was not implemented could be determined later by a routine status inquiry to the terminal.

Another mode of redundancy is provided by causing a terminal to answer a status inquiry by sending its address on the return line along with a status bit. Since a terminal should only respond on the return line after being addressed by the central controller, a comparison of the returned address with that transmitted by the controller provides an additional error check.

The resulting DC, serial, redundant transmission is relatively slow compared to typical computer terminal systems, but that higher speed, which is not required in systems of the present invention, is traded off in favor of simplicity and reliability.

Other objectives, advantages and applications of the invention will be made apparent by the following detailed description of a preferred embodiment of the invention. The description makes reference to the accompanying drawings in which:

FIG. 3 is a schematic diagram of one of the repeaters employed with the present invention.

Figure 1:
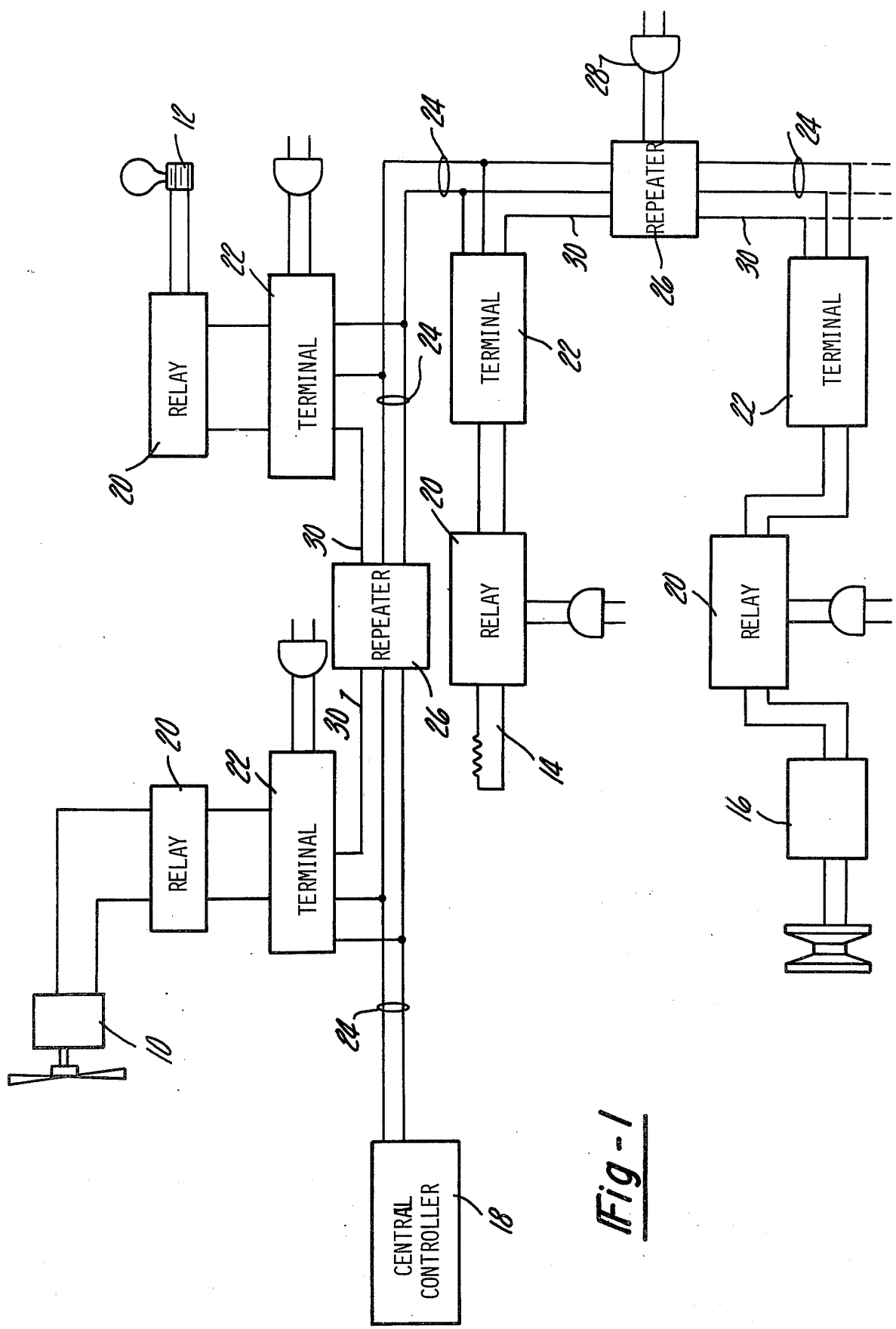
FIG. 1 is an overall block diagram of the system of the present invention.

Referring to FIG. 1, the system of the present invention is adapted to control and monitor the condition of the plurality of loads, exemplified by a motor driven blower 10, an electric light 12, a resistance heater 14 and an electric motor 16, from a central station or controller 18. It should be recognized that the present invention could be used to control other forms of loads such as valves, diverters and the like. Moreover, in broad concept the system of the present invention is actually a communication system and could be used for a variety of mixed communication and control tasks.

The central controller 18 may contain a program controlled computer, a timing clock, or may be manually energized.

Each of the loads may be turned on or off through an associated relay 20. The status of each relay is in turn controlled by an individual terminal 22 physically associated with the load and relay. The status of each of the terminals may be individually adjusted by the central controller 18 acting over a two-wire common bus 24 which connects to each of the terminals. Over long runs of the bus the signal levels on the bus are restored by repeater units 26. The repeaters have connection to an electrical power supply via plug 28 and also provide power to nearby terminals over lines 30 which run with the bus lines 24.

Signals sent from the central controller 18 to a particular terminal 22 may control the status of the relay 20 associated with that terminal in order to turn the loads controlled by the relay on or off, and may cause signals to be sent back to the controller by the terminal over the return line of the bus 24, indicating whether the associated load is energized or de-energized.

The messages sent by by the central controller over one line of the common bus 24 consist of serial, nine-bit messages, prefaced by a relatively long duration, i.e., about three millisecond, start message bit. Eight of the bits constitute the digital address of one of the terminals 22 and the eight bit also acts as a parity bit. The ninth bit acts as a command.

Figure 2:
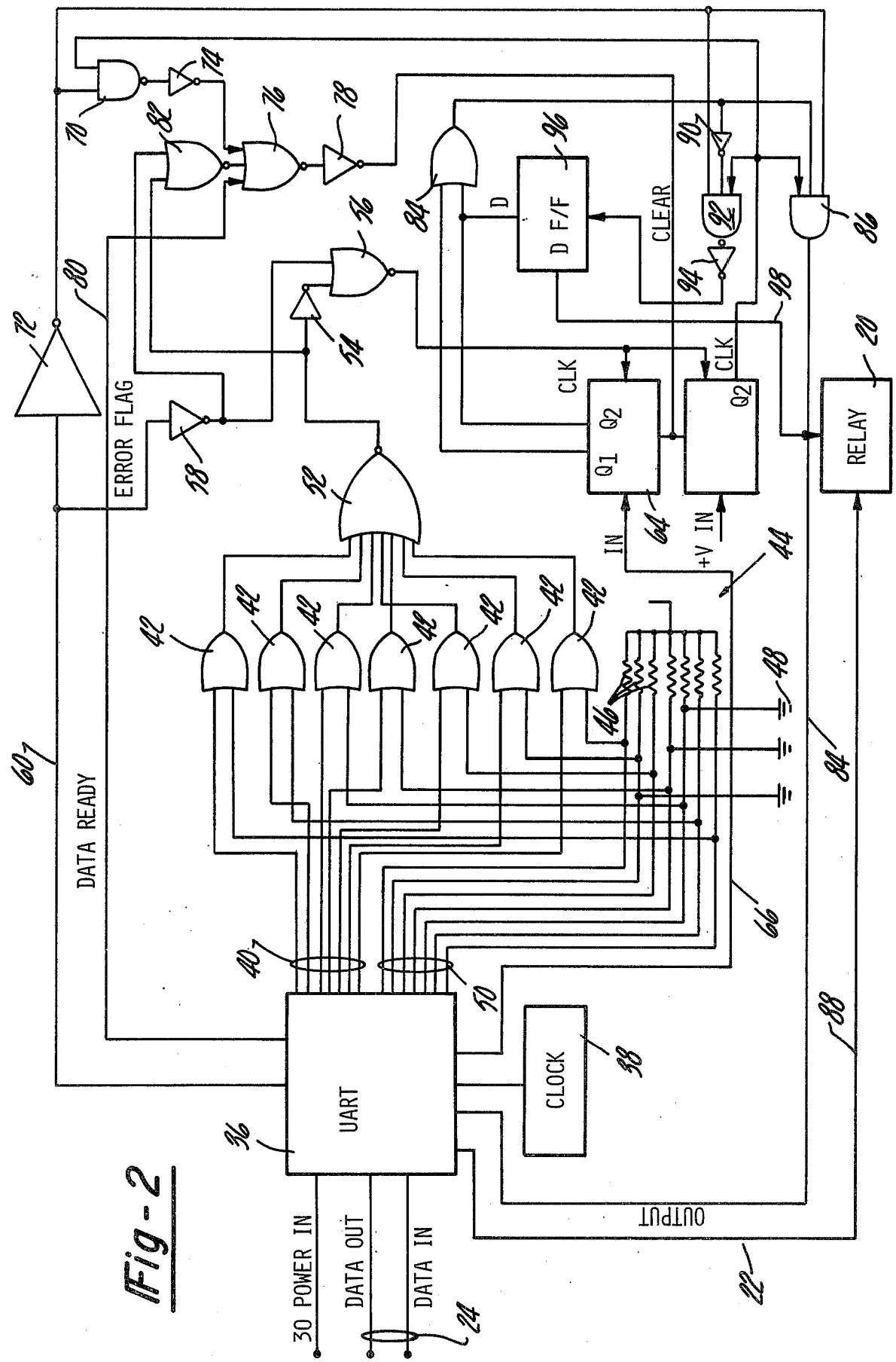
FIG. 2 is a schematic diagram of one of the terminals of the present invention.

The structure of one of the terminals 22 is illustrated schematically in FIG. 2. Both the incoming and outgoing data lines of the bus 24 are applied to a universal asynchronous receiver-transmitter (UART) 36 within a terminal 22. UARTS are commercially available in the form of integrated circuits and the preferred embodiment of the present invention employs a device manufactured by General Instruments Company and designated AY-1013.

A clock 38 provides a relatively high frequency timing source for the UART; for example, the clock may have a frequency of two megacycles.

Each clock cycle the UART tests the state of the incoming data line of the bus 24. If a high signal is present for several clock pulses, the UART interprets that as a start of message bit and decodes and stores the nine bits of the following message. The UART also internally generates a parity count and compares it with the eighth bit in the transmission. The first seven bits of the address are outputted on line 40 to seven exclusive OR gates 42. These gates each have a second input from an internal address source, generally indicated at 44, which consists of a plurality of resistors 46, some of which are grounded by lines 48 to define an internal address. This address source 44 is also applied to the UART via lines 50 so the UART may output the device's address on the bus 24 in response to a status request from the central controller 18.

The exclusive OR gates 42 each provide a zero output if both inputs of their are the same and all of these outputs are provided to a NOR gate 52. The output of the NOR gate 52 is provided to an inverter 54 which accordingly provides a high output when the incoming address compares properly with the stored device address. The output of the inverter 54 is applied to a NOR gate 56. The other input to the NOR gate represents the output of an inverter 58 connected to the UART 36 through line 60 and carrying a signal indicating that an entire message has been received and assembled. Upon occurrence of this signal, if an address coincidence signal is provided by the inverter 56, the gate 56 provides clocking outputs to a pair of two-state shift registers 62 and 64.

The shift register 64 has a permanently high input so that a one is placed into the input stage each time a clock pulse is received. The shift register 62 receives an input from the UART on line 66 which represents the single command bit of a data message. Accordingly, upon receipt of a clock pulse from the gate 56, the register 64 shifts in either a one or a zero depending upon the state of the line 66. Assuming that the contents of the shift register 62 and 64 are initially cleared, after two outputs from the gate 56, an output will appear on line 68, from the Q2 output of shift register 62. The Q1 output of the register 64 will carry the identity of the most recent command bit and the Q2 output of register 64 will carry the identity of the previous command bit.

Line 68 connects to one input of an AND gate 70 which receives the data-ready signal from the UART on line 60, as delayed by an inverter 72. The output of the gate 70 is provided to an inverter 74 and the output of the inverter is provided to a NOR gate 76, which, with an associated inverter 78, acts as an OR gate. Another input to the NOR gate 76 is on line 80 from the UART which constitutes a parity error flag. The third input to the NOR gate 76 is from a NOR gate 82 which receives the delayed data ready signal from inverter 58 and te output of the NOR gate 52.

The output of inverter 78 is provided as a clearing signal for both the shift registers 62 and 64. Thus, the shift registers are cleared when there has been a parity error or after the second simultaneous correct address has been received and utilized, or when the second address received does not accord with the terminal address. The Q1 and Q2 outputs of the shift register 64, representing the two command bits associated with two consecutive correct addresses, are provided to an exclusive OR gate 84 which provides a low output if they are both the same and a high output otherwise. The receipt of two consecutive correct addresses with different command bits signifies a status request, and this signal is provided to an AND gate 86. The other two conditioning inputs the gate 86 are line 68, indicating that two consecutive correct addresses have been received and the delayed data-ready signal from inverter 72. Upon the occurrence of these signals a signal is provided on line 88 to the UART causing it to output a signal on the data bus containing first the eight bits of the device's address and then a status bit of the relay 20, which is provided to the UART on line 88.

The output of gate 84 is also provided to an inverter 90 which feeds an NAND gate 92. The other two inputs to the NAND gate 92 are the delay data-ready signal from the inverter 72 and the Q2 output of shift register 62, signifying the receipt of two consecutive correct addresses, one line 68. Thus, the NAND gate 92 provides an output when the same command bits have been associated with two consecutive addresses. This signal is provided through an inverter 94 to the clock input of a D flip-flop 96. The data signal for the flip-flop 96 is provided by the Q2 output of gate 64, and thus depends upon the nature of the two consecutive identical command bits. Depending upon that nature, a zero or a one is provided on line 98 to the associated control relay 20. The control relay assumes an open or a closed state depending upon the condition of the D flip-flop 96. The D flip-flop acts to latch that condition until it is later altered by appropriate signals from the central processor.

One of the repeaters 26 is illustrated in schematic form in FIG. 3. The receiver includes a pair of amplifier sections, generally indicated at 100 and 102. The amplifier 100 services the data bus line that carries messages from the controller 19 to the terminals and the amplifier 102 carries the return lines. Each amplifier consists of two stages of NPN transistor amplifiers in a grounded emitter configuration. The line cord 28 connects to a power supply 104 which provides internal power for the repeater and also power to the adjacent terminal in the line.

The embodiments of the invention in which an exclusive property or privilege is claimed are defined as follows:

1. An electrical control system for controlling a plurality of electrical loads comprising:
   central controller means;
   a plurality of control means each associated with a respective one of said loads;
   each of said control means including means for controlling its respective associated load and each of said control means having a plurality of control states;
   said central controller means incuding means for selectively transmitting multibit digital serial messages, each of said serial messages consisting of a plurality of individually unique multibit address signals, each corresponding to one of said terminal means and each of said serial messages further including a command signal;
   each of said control means including terminal means;
   a common bus connecting said central controller means and each of said terminal means adapted to receive and transmit said serial messages from said central controller means to all of said terminal means;
   each terminal means including means responsive to the receipt of at least two consecutive serial messages containing its corresponding unique address signal to cause said control means to assume one of said states, each state corresponding to a differing combination of command signals transmitted in said consecutively received serial messages;
   whereby each of said control means is caused to assume one of said states upon receipt of said consecutive serial messages both containing said unique address signal and a combination of command signals in said consecutive messages corresponding to said state.

2. The control system according to claim 1 wherein each of said command signals in said serial messages is comprised of a single binary bit.

3. The control system according to claim 2 wherein each of said control means includes means responsive to a first of said states of said control means to turn on its associated load and further includes means responsive to a second of said control means to turn off its associated load, and further including means responsive to said control means assuming a third one of said control means states to transmit a return message to said central controller means indicating a status of the associated load.

4. The control system according to claim 3 wherein each of said terminal means causing said control means to assume one of said states includes means responsive to the receipt of command signals in said consecutively received serial message of the same and different values to cause said control means to assume a state corresponding to each of said signal value relationships in said consecutively received serial messages.

5. The control system according to claim 1 wherein each of said terminal means includes an address signal storage means storing the unique address signal transmitted by said central controller means corresponding to said respective terminal means if the previous address signal contained in the previous serial message was not said unique address signal, each of said terminal means further including comparison means for comparing consecutive address signals received on said bus from said central controller means, said comparison means further including means causing said control means to assume one of said states if the subsequent consecutive address signal is also comprised of said unique address signal.

6. The control system according to claim 5 wherein said comparison means further includes means for removing said address signal storage means if said subsequent consecutive address signal contained in the next subsequent serial message received on said bus from said central controller means is not said unique address signal.

* * * * *